(12) United States Patent
Imai

(10) Patent No.: US 11,383,159 B2
(45) Date of Patent: Jul. 12, 2022

(54) CONTROL PROGRAM, GAME DEVICE, AND CONTROL METHOD

(71) Applicant: GREE, INC., Tokyo (JP)

(72) Inventor: Hitoshi Imai, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/689,197

(22) Filed: Nov. 20, 2019

(65) Prior Publication Data

US 2020/0155937 A1 May 21, 2020

(30) Foreign Application Priority Data

Nov. 20, 2018 (JP) .............................. JP2018-217600

(51) Int. Cl.
*A63F 13/40* (2014.01)
*A63F 13/814* (2014.01)
(Continued)

(52) U.S. Cl.
CPC ............ *A63F 13/40* (2014.09); *A63F 13/211* (2014.09); *A63F 13/245* (2014.09);
(Continued)

(58) Field of Classification Search
CPC ...... A63F 13/40; A63F 13/211; A63F 13/245; A63F 13/814; A63F 2300/6045; A63F 2300/638; A63F 2300/8047
See application file for complete search history.

(56) References Cited

U.S. PATENT DOCUMENTS

| 5,925,127 A | * | 7/1999 | Ahmad | ................. G06F 21/121 |
| | | | | 726/31 |
| 2002/0137566 A1 | * | 9/2002 | Tomizawa | .............. A63F 13/67 |
| | | | | 463/46 |

(Continued)

FOREIGN PATENT DOCUMENTS

| JP | 2008-194282 A | 8/2008 |
| JP | 2008-307409 A | 12/2008 |
| JP | 2012-63876 A | 3/2012 |

OTHER PUBLICATIONS

"Fishing Resort Wii Gameplay HD"video by Muffin Man Console Gameplays, posted Jul. 6, 2016, https://www.youtube.com/watch?v=fdjxE5XWNa4 . (Year: 2016).*
(Continued)

*Primary Examiner* — James S. McClellan
*Assistant Examiner* — Ross A Williams
(74) *Attorney, Agent, or Firm* — Oliff PLC

(57) ABSTRACT

A non-transitory computer-readable medium stores a control program for a game device connectable to an operation device that is held by a player or attached to a certain position on the body of the player. The control program causes the game device to execute the following: causing a first image to be displayed on a display device in order to cause the player to perform a movement such that a posture of the operation device becomes a specified posture; retrieving posture information relating to the posture of the operation device at a certain timing; determining a degree of matching between the posture of the operation device and the specified posture based on the retrieved posture information; and causing a second image in accordance with the determination result to be displayed on the display device.

7 Claims, 10 Drawing Sheets

(51) Int. Cl.
*A63F 13/245* (2014.01)
*A63F 13/211* (2014.01)

(52) U.S. Cl.
CPC .... *A63F 13/814* (2014.09); *A63F 2300/6045* (2013.01); *A63F 2300/638* (2013.01); *A63F 2300/8047* (2013.01)

(56) References Cited

U.S. PATENT DOCUMENTS

| | | | | |
|---|---|---|---|---|
| 2006/0256081 | A1* | 11/2006 | Zalewski | G06F 3/011 345/156 |
| 2006/0264258 | A1* | 11/2006 | Zalewski | A63F 13/215 463/36 |
| 2008/0113798 | A1* | 5/2008 | Miyanaga | A63F 13/24 463/37 |
| 2015/0286279 | A1* | 10/2015 | Lim | G06F 3/0346 715/863 |
| 2017/0336882 | A1* | 11/2017 | Tome | G06F 3/0346 |
| 2018/0067545 | A1* | 3/2018 | Provancher | A63F 13/218 |
| 2018/0345128 | A1* | 12/2018 | Ahmed | A63F 13/537 |

OTHER PUBLICATIONS

Jan. 14, 2020 Office Action issued in Japanese Patent Application No. 2018-217600.
Dec. 7, 2021 Office Action issued in Japanese Patent Application No. 2020-127054.
Jun. 15, 2021 Office Action issued in Japanese Patent Application No. 2020-127054.
AtPress, "Nintendo Switch Software 'Waiwai! Wall Challenge'" <https://www.atpress.ne.jp/news/167423> (Oct. 2, 2018).

* cited by examiner

| OPERATION DEVICE IDENTIFICATION INFORMATION |
|---|
| X-AXIS DIRECTION ACCELERATION INFORMATION |
| Y-AXIS DIRECTION ACCELERATION INFORMATION |
| Z-AXIS DIRECTION ACCELERATION INFORMATION |
| X-AXIS ANGULAR SPEED INFORMATION |
| Y-AXIS ANGULAR SPEED INFORMATION |
| Z-AXIS ANGULAR SPEED INFORMATION |
| INPUT PORTION OPERATION INFORMATION |

FIG. 5

CONTROL PROGRAM, GAME DEVICE, AND CONTROL METHOD

This application claims the benefit of priority from Japanese Patent Application No. 2018-217600 filed Nov. 20, 2018, the entire contents of the prior application being incorporated herein by reference.

TECHNICAL FIELD

This invention relates to a control program, a game device, and a control method.

Conventionally, game devices have been known in which a game is caused to progress based on operation information from a controller held by a player. In this kind of game device, operation information from a motion sensor housed in the controller is transmitted to the device main body by wired or wireless communications, and the device main body can execute the game process based on the operation information received.

With this kind of game device, it is known that there are cases in which the output value of the motion sensor differs even when the player holding the controller does the same action, in accordance with the surrounding environment at the location where the game device is used, the usage method of the player's controller, or the like.

For example, Patent Document 1 discloses a game system in which a game device having a controller provided internally with a motion sensor such as an acceleration sensor, a geomagnetic sensor, a gyro sensor or the like performs a calibration process. In this game system, prior to the calibration process being executed, a guide screen is displayed for guiding how the posture or the like of the controller that is the object of calibration should be changed.

PRIOR ART TECHNOLOGY DOCUMENT

Patent Document

[Patent Document 1] JP 2012-63876 A

SUMMARY

Problem to be Resolved

However, the player may feel that the operation or the like for calibration performed prior to the start of the game is useless, or by causing the player to perform this operation, the player's desire to play the game could decline. In addition, the guide screen for calibration is unrelated to the progress of the game and the game world view could be lost, or the player's sense of immersion in the game could drop.

This disclosure was designed to resolve the foregoing problems, and can realize calibration of the motion sensor without causing the player to be aware that an operation for calibration is being performed.

Means for Resolving the Problem

A non-transitory computer-readable medium stores a control program for a game device connectable to an operation device that can be held by a player or can be attached to a certain position on the body of the player, wherein the control program causes the game device to execute the following: causing a first image to be displayed on a display device in order to cause the player to perform a movement such that the posture of the operation device becomes a specified posture; retrieve posture information relating to the posture of the operation device at a certain timing; determining a degree of matching between the posture of the operation device and the specified posture based on the retrieved posture information; and causing a second image in accordance with the determination results to be displayed on the display device.

In addition, in the control program, preferably the first image is an image for causing the player holding the operation device, or to whom the operation device is attached, to take a certain pose, and when the degree of matching is less than a certain value, the second image is an image for causing the player to again take the certain pose.

In addition, in the control program, preferably the game device executes a game in which at least one game content is caught, the first image is an image for causing the player holding the operation device, or to whom the operation device is attached, to perform a movement in order to change the degree of difficulty of catching the at least one game content, the second image is an image indicating progress of the game, and the higher the degree of matching, the more the difficulty of catching decreases.

In addition, in the control program, preferably the game device executes a game in which a game object is used by a player game content operated by the player, the first image is an image that includes an image showing the at least one game object to the player holding the operation device and causes the player to perform an action of grasping the game object, and when the degree of matching is higher that a certain value, the second image is an image showing the progress of the game in which the game object on which the player game content performed the action of grasping is used.

In addition, in the game device, preferably the game device executes a first game in which at least one game content is caught in each of a plurality of game fields, and a second game that moves within a virtual space showing two game fields out of the plurality of game fields; the first image is an image showing progress of the second game, and is an image for causing the player holding the operation device, or to whom the operation device is attached, to maneuver the game object moving in the virtual space; and when the progress of the second game concludes and the degree of matching is higher than a certain value, the second image is an image showing the progress of the first game in a destination game field.

A game device is connectable to an operation device that can be held by a player, or can be attached to a certain position on the body of the player, the game device comprising one or more processors programmed to: cause a first image to be displayed on a display device to cause the player to perform a movement such that the posture of the operation device becomes a specified posture; retrieve posture information relating to the posture of the operation device at a certain timing; determine a degree of matching between the posture of the operation device and the specified posture based on the retrieved posture information; and cause a second image corresponding to results of the determination to be displayed on the display device.

A control method is for a game device connectable to an operation device that can be held by a player, or can be attached to a certain position on the body of the player, the control method including: causing a first image to be displayed on a display device in order to cause the player to perform a movement such that the posture of the operation device becomes a specified posture; retrieving posture information relating to the posture of the operation device at a certain timing; determining a degree of matching between the posture of the operation device and the specified posture based on the retrieved posture information; and causing a second image in accordance with the determination results to be displayed on the display device.

Effects

Through the control program, game device and control method according to this disclosure, it is possible to realize calibration of a motion sensor without causing the player to be aware that an operation for calibration is being performed.

BRIEF EXPLANATION OF DRAWINGS

FIG. 5 is a diagram showing one example of a data structure of operation information output by the operation device.

MODES TO IMPLEMENT EMBODIMENTS

Below, various embodiments are described with reference to the drawings. However, the technical scope is not limited to these embodiments, and is to be construed to be the features recited in the claims, and equivalents thereof.

Figure 1:
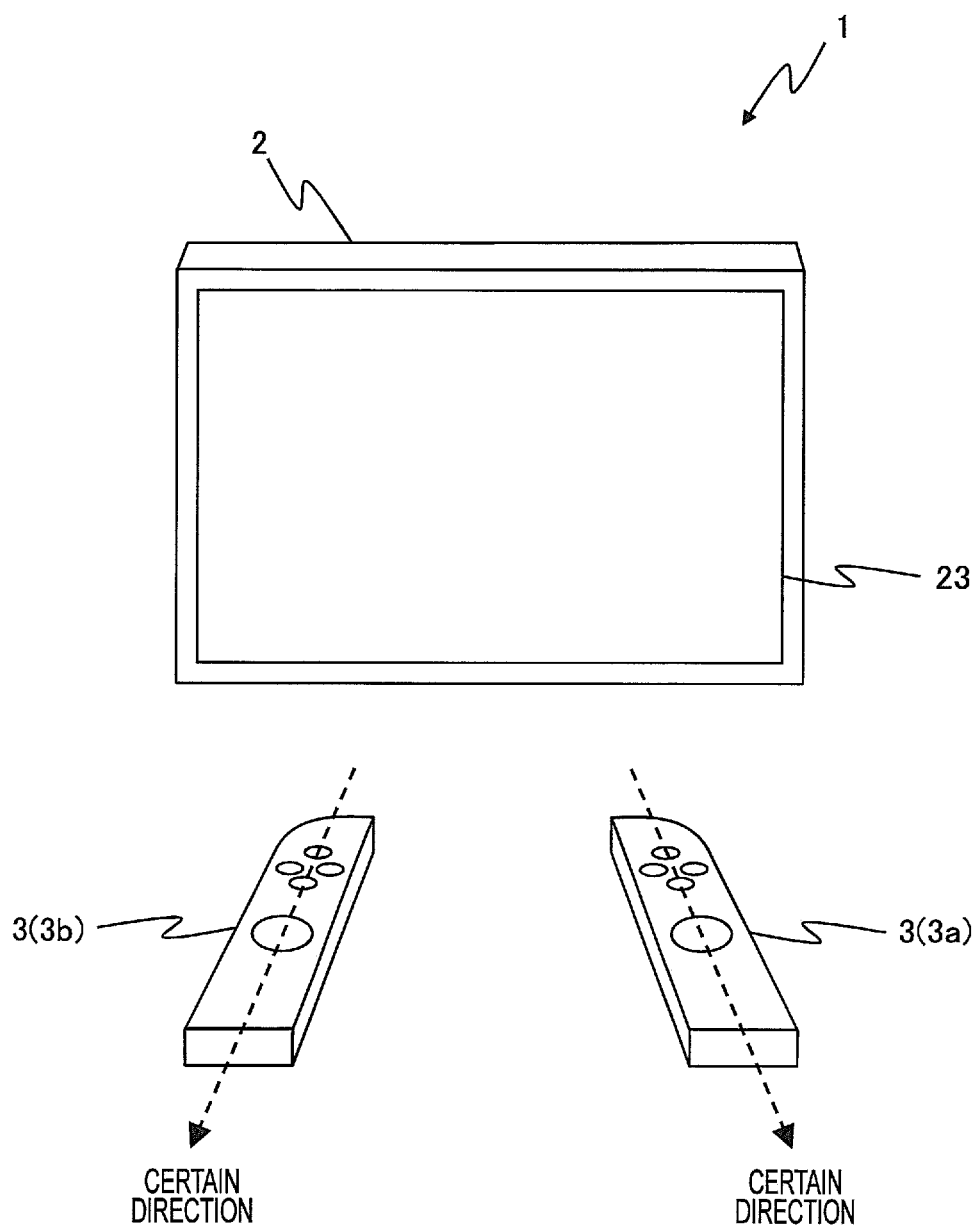
FIG. 1 is a diagram showing one example of a schematic configuration of a game device.

FIG. 1 is a diagram showing one example of a schematic configuration of a game device 1. The game device 1 is home-use game equipment such as a console game system or the like, a personal computer, a multifunction mobile phone (a so-called "smartphone"), a tablet terminal or a tablet PC, or the like. The home-use game equipment may be a desktop model or a portable model. In addition, the game device 1 may also be commercial game equipment such as arcade game equipment or the like installed at a customer-attracting facility such as an amusement facility, a special event facility or an event facility, or the like.

The game device 1 in this embodiment displays screens related to the game. The screens related to the game are, for example, a screen showing the start or end of the game, and a game progress screen or the like that includes an image indicating the progress of the game.

The image indicating the progress of the game is, for example, an image showing a virtual game space including at least one type or a plurality of types of objects. The virtual game space is defined by three coordinate axes, and various objects having three-dimensional coordinates are placed within the virtual game space. The virtual game space may be defined by two coordinate axes, and in this case, various objects having two-dimensional coordinates are placed within the virtual game space.

The shapes of the objects are shapes simulating certain objects (vehicles, trees, people, animals, plants, buildings and the like). The object shapes may be cuboid shapes, rectangular shapes, cylindrical shapes, spherical shapes, plate shapes, or the like. The object shapes may deform with the passing of time.

A virtual camera is placed at a certain position within the virtual game space. The three-dimensional coordinates of various objects placed within the virtual game space are projected onto a certain two-dimensional screen placed in the line-of-sight direction of the virtual camera. The game device 1 displays the images of the two-dimensional screen on which the various objects are projected on a display device or the like.

Of the objects within the virtual game space, an object indicating the player character and objects indicating items or tools or the like possessed by the player character are controlled so as to change based on operation information corresponding to the player's movements. Hereafter, the player character at times is called a player game content. Changes in the objects include the objects moving within the virtual game space, the external shapes of the objects deforming, and the objects breaking apart or coalescing. In addition, of the objects within the virtual game space, objects indicating birds and fish and the like are controlled so as to change automatically based on certain movement commands.

In the example shown in FIG. 1, the game device 1 includes a game processing device 2 provided with a display device 23, and operation devices 3a and 3b. The operation devices 3a and 3b are devices having the same configuration, and below, at times the operation devices 3a and 3b are respectively called the operation device 3. The game device 1 may also have three or more operation devices 3.

The operation device 3 is equipped with a motion sensor. The player holds the operation device 3a in the right hand and the operation device 3b in the left hand, and performs various movements related to the game provided by the game device 1. The player may hold the operation device 3a in the left hand and the operation device 3b in the right hand, and in addition, may hold only the operation device 3a in the left hand, the right hand or both hands. The motion sensor provided in the operation device(s) 3 generates operation information in accordance with various movements of the player, and the operation device(s) 3 outputs the generated operation information to the game processing device 2.

The operation device 3 may be attached to a certain part of the player's body. For example, the operation device 3 may be attached to the left or right upper arm or forearm, or the left or right leg, or the like. The operation device 3 may be attached to any part of the player's body as long as detection of the player's movements is possible.

The motion sensor is a sensor for measuring the movements of the player and is, for example, an acceleration sensor. The motion sensor may be an angular speed sensor, a displacement sensor, an orientation measurement sensor, an image sensor, an optical sensor or the like. The angular speed sensor is, for example, a gyro sensor. In addition, the orientation measurement sensor is a geomagnetic sensor. The motion sensor may also be provided with a plurality of sensors for measuring the player's movements.

When a player who is holding the operation device 3a with the right hand and holding the operation device 3b with the left hand performs a certain movement, the respective motion sensors in the operation device 3a and the operation device 3b output the respective operation information of the operation device 3a and the operation device 3b. When the motion sensors are acceleration sensors, the motion sensor of the operation device 3a detects acceleration of the operation device 3a and outputs acceleration information indicating the detected acceleration. In addition, the motion sensor of the operation device 3b detects acceleration of the operation device 3b and outputs acceleration information indicating the detected acceleration.

The operation device 3 outputs the operation information from the motion sensor to the game processing device 2. Upon retrieving the operation information, the game processing device 2 causes objects corresponding to the operation information to change, and generates image data for displaying a virtual game space that includes the changed objects. For example, when acceleration information is detected as the operation information, the game processing device 2 calculates the movement speed of the objects corresponding to the acceleration information, and causes the objects to move within the virtual game space based on the calculated movement speed. The game processing device 2 generates image data for a two-dimensional screen that is a projection of the virtual game space including the moving objects, and displays an image showing the virtual game space on the display device 23 based on the generated image data. Objects that automatically change based on certain movement commands may be included in the virtual game space.

In the game device 1 of this embodiment, prior to the start of the game, a calibration process for the motion sensor provided in the operation device 3 is executed. Hereafter, there are times at which a game that is started after the calibration process is executed is abbreviated as a "subsequent game." Below, the description will take as an example a case in which the operation device 3 is provided with an acceleration sensor as the motion sensor.

In the calibration process, first the game processing device 2 causes a posture instruction image, for causing the player to perform a movement such that the posture of the operation device 3 achieves a specified posture, to be displayed on the display device 23. For example, the specified posture is a posture of the operation device 3 such that a certain direction preset in the operation device 3 (the lengthwise direction in the case where the operation device 3 is rod-shaped) is approximately the same as a vertical direction.

The posture instruction image is, for example, an image that shows the pose of the player holding the operation device 3, and is an image in which the operation device 3 has a specific posture. In addition, the posture instruction image may be a game object image showing a certain item that the player game content operated by the player uses in the game. The player game content is, for example, a player character. In addition, the posture instruction image may be an operation object image that is a game object operated by the player via the operation device 3. The operation object image is, for example, an image showing the steering wheel or the like of a car, bike, ship, airplane or the like.

If the player securely holds the operation device 3 without moving, the acceleration sensor provided in the operation device 3 detects only vertically downward gravitational acceleration. When the player securely holds the operation device 3 without moving so that the posture of the operation device 3 is a specified posture, the operation device 3 retrieves posture information relating to the posture of the operation device with a certain timing. The posture information is, for example, information showing the vertically downward direction of the gravitational acceleration detected by the acceleration sensor.

Next, the game processing device 2 determines the degree of matching of the posture of the operation device 3 and a specified posture based on the posture information retrieved. The degree of matching is determined for example based on the angle of difference between (i) the vertically downward direction of the gravitational acceleration detected by the acceleration sensor of the operation device 3 and (ii) the certain direction of the operation device 3. In this case, the game processing device 2 determines a higher degree of matching the smaller the angle of difference is.

Then, the game processing device 2 causes a game image corresponding to the result of the determination of the degree of matching to be displayed on the display device 23, and concludes calibration processing (the process of storing in memory the detected direction of gravitational acceleration). When the degree of matching is higher than a certain value (for example, when the angle of difference is smaller than a certain angle), the determination is made that calibration was successful, for example, and an image indicating that calibration was successful is displayed as a game image. In addition, when the degree of matching is not greater than a certain value (for example, when the angle of difference is a certain angle or greater), the determination is made that calibration failed, and an image indicating that calibration failed is displayed as a game image. When it is determined that calibration failed, an image encouraging the player to again perform the operation for calibration may be included in the game image.

In addition, the game image may be an image showing progress of a subsequent game executed by the game processing device 2. For example, the difficulty of the subsequent game may be controlled so as to change in accordance with the degree of matching. In this case, the game processing device 2 may control progress of the subsequent game such that the subsequent game becomes easier the higher the degree of matching, or may control progress of the subsequent game such that the subsequent game becomes more difficult the higher the degree of matching.

As described above with to FIG. 1, the game device 1 can realize calibration of the motion sensor without the player being aware of performing an operation for calibration.

The foregoing description is merely a description to deepen the understanding of the content of this invention. This invention may be implemented in each of the embodiments described next, and may be implemented through various variations without substantively departing from the principles of this invention. Such variations are all included within the disclosed scope of this invention and this specification.

Figure 2:
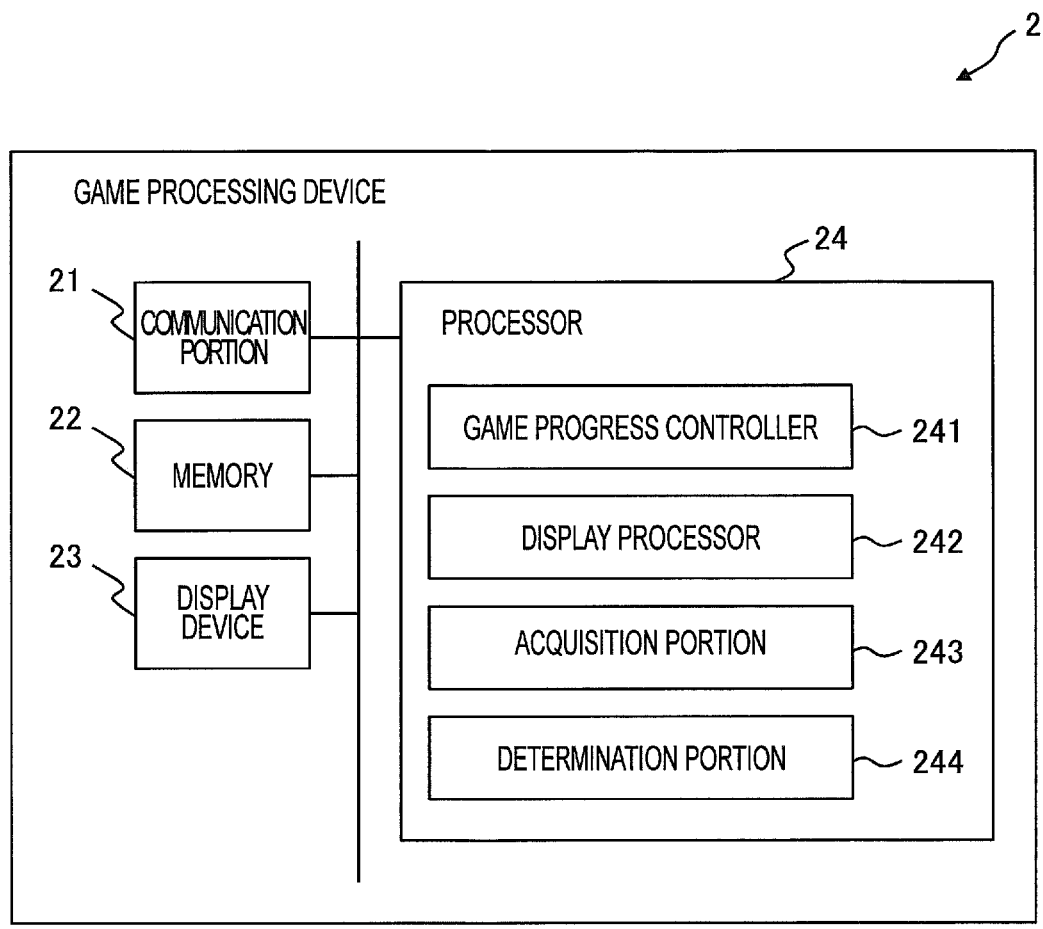
FIG. 2 is a diagram showing one example of a schematic configuration of a game processing device.

FIG. 2 is a diagram showing one example of a schematic configuration of the game processing device.

The game processing device 2 is an information processing device having a function that retrieves operation information corresponding to the player's movements from the operation device 3, and displays an image showing the virtual game space including objects that change in accordance with the retrieved operation information. The game processing device 2 may be any kind of information processing device if connectable to the operation device 3. For example, the game processing device 2 may be a personal computer, a multifunction mobile phone (a so-called "smartphone"), a tablet terminal, a tablet PC, a mobile phone (a so-called "feature phone"), a portable musical player, or a notebook PC.

As shown in FIG. 2, the game processing device 2 comprises a communication portion 21, a memory 22, a display device 23 and a processor 24. Below, the communication portion 21, the memory 22, the display device 23 and the processor 24 with which the game processing device 2 is equipped are described.

The communication portion 21 has an interface circuit for performing short-range wireless communication in accordance with a communication protocol such as Bluetooth ® or the like, and receives radio waves broadcast from the operation device 3. The interface circuit of the communication portion 21 is not limited to one for performing short-range wireless communications. For example, the communication portion 21 may have a receiving circuit for receiving various types of signals transmitted by infrared communications or the like. The communication portion 21 demodulates the radio waves broadcast from the operation device 3 into a certain signal and supplies such to the processor 24.

The memory 22 comprises a semiconductor memory device such as Read Only Memory (ROM), Random Access Memory (RAM) or the like, for example. The memory 22 stores an operating system program, driver programs, an application program and data and the like used in processing by the processor 24. The driver programs stored in the memory 22 are a communication device driver program that controls the communication portion 21, and an output device driver program that controls the display device 23. The application program stored in the memory 22 is a control program or the like that controls progress of the game and so forth. The data stored in the memory 22 is various types of data used by the processor 24 and the like during execution of the game. In addition, the memory 22 may temporarily store temporary data relating to certain processes.

The information stored in the memory 22 is, for example, information relating to the virtual game space (three-dimensional coordinates showing the position of a virtual camera, information relating to the line of sight direction and field of view of the virtual camera, three-dimensional coordinates showing the size and position of a two-dimensional screen, and the like), and information relating to various types of objects within the virtual game space (information of three-dimensional coordinates showing the shapes of objects, information of three-dimensional coordinates showing the placement position of objects, and the like). In addition, the information stored in the memory 22 may be various types of game information accompanying progress of the game (information relating to player scores, player game media or game objects or the like (Hit Points (HP), Magic Points (MP)) and the like).

The display device 23 is a liquid crystal display. The display device 23 may also be an organic electroluminescence (EL) display or the like. The display device 23 displays images corresponding to image data provided from the processor 24. The image data is still image data or moving image data, and the displayed image is a still image or a moving image. The display device 23 may also display video corresponding to video data supplied from the processor 24.

The processor 24 comprises one processor or a plurality of processors, and peripheral circuits thereof. The processor 24 comprehensively controls the overall action of the game processing device 2, and for example is a central processing unit (CPU). The processor 24 executes various types of information processing in an appropriate order based on the programs stored in the memory 22, and on operation information and the like from the operation device 3, and controls the action of the display device 23. The processor 24 executes various types of information processing based on the operating system program, driver programs and application program stored in the memory 22. In addition, the processor 24 can execute a plurality of programs in parallel.

The processor 24 comprises a game progress controller 241 and a display processor 242. These controllers are function modules that are realized by programs executed by a processor with which the processor 24 is equipped. Or, these controllers may be installed in the game processing device 2 as firmware.

Figure 3:
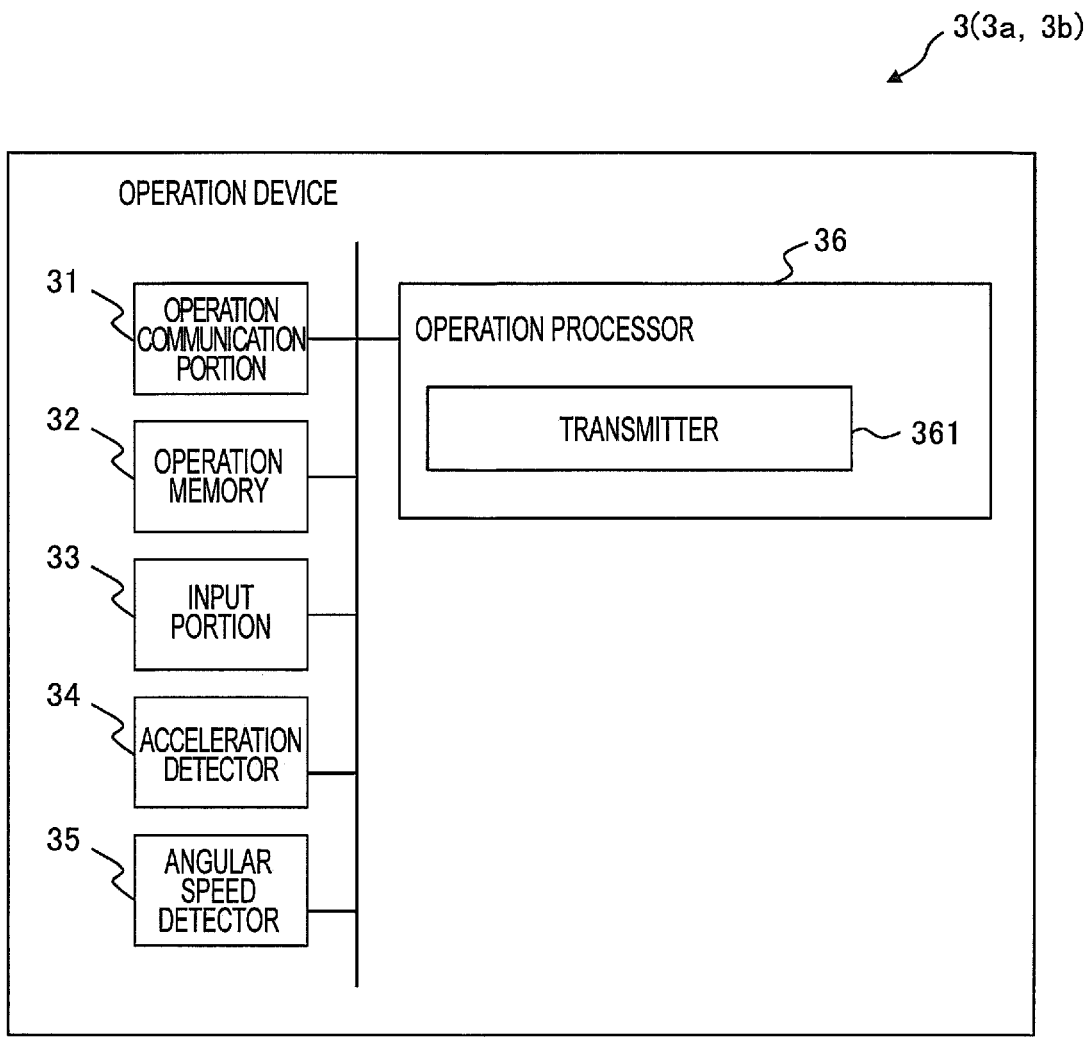
FIG. 3 is a diagram showing one example of a schematic configuration of an operation device.

FIG. 3 is a diagram showing one example of a schematic configuration of the operation device 3. The operation device 3 has the function of outputting operation information in accordance with the player's movements to the game processing device 2. Consequently, the operation device 3 comprises an operation communication portion 31, an operation memory 32, an input portion 33, an acceleration detector 34, an angular speed detector 35 and an operation processor 36.

Below, the operation communication portion 31, the operation memory 32, the input portion 33, the acceleration detector 34, the angular speed detector 35 and the operation processor 36 with which the operation device 3 is equipped are described, with reference to FIG. 3.

The operation communication portion 31 has an interface circuit for performing short-range wireless communication in accordance with a communication protocol such as Bluetooth ® or the like, and performs direct wireless communication by terminal-to-terminal wireless communication with the game processing device 2. The interface circuit of the operation communication portion 31 is not limited to one performing short-range wireless communication. For example, the operation communication portion 31 may have a transmission circuit for transmitting various types of signals by infrared communication or the like. The operation communication portion 31 demodulates signals retrieved from the operation processor 36 into certain radio waves, and broadcasts such.

The operation memory 32 comprises a semiconductor memory device or the like such as ROM, RAM or the like. The operation memory 32 stores programs, data, parameters and the like used in processing by the operation processor 36. The programs stored in the operation memory 32 are communication device driver programs or the like that control the operation communication portion 31. The data stored in the operation memory 32 is operation device identification information or the like for identifying the operation device 3.

Input portions 33a and 33b are keys or buttons or the like that the player can press. The input portions 33a and 33b have force sensors, for example, and the force sensors detect the pressing force generated when the input portions 33a and 33b are pressed by the player. Each time a pressing force is detected by the force sensors, the input portions 33a and 33b output to the operation processor 36 input portion operation information corresponding to the input portions 33a and 33b where the pressing force was detected. Below, there are cases in which the input portions 33a and 33b are each called the input portion 33.

The acceleration detector 34 is an acceleration sensor and detects the acceleration applied to the operation device 3 in each of the three axis directions, at a certain time interval. The acceleration sensor is, for example, a piezoresistive three-axis acceleration sensor that uses the piezoresistive effect, or a capacitance-type three-axis acceleration sensor or the like that uses change in capacitance. The acceleration detector 34 outputs acceleration information showing the detected acceleration to the operation processor 36 at certain time intervals (for example, 1/100-second intervals).

Figure 4A:
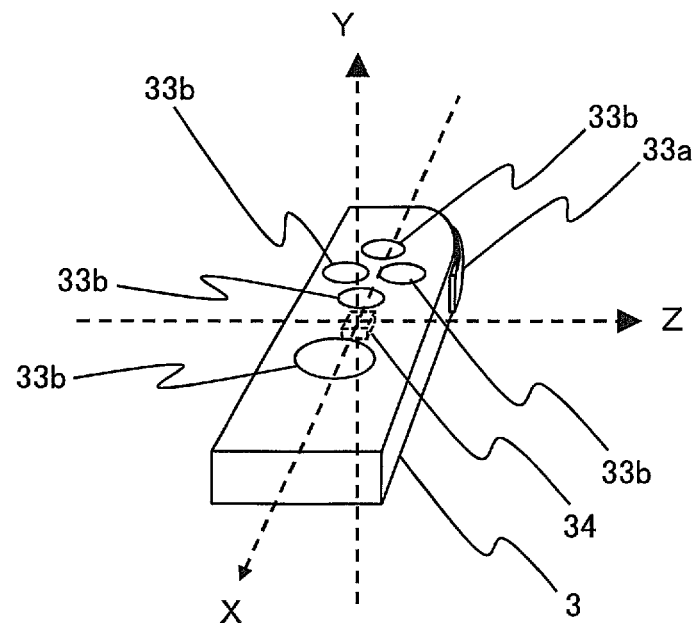
FIG. 4(a) is a schematic view for describing one example of an acceleration detection direction in an acceleration detector.

FIG. 4(a) is a schematic view for describing one example of the acceleration detection directions in the acceleration detector 34. In the example shown in FIG. 4(a), the acceleration detector 34 detects acceleration in each of the X-axis direction, Y-axis direction and Z-axis direction. The X-axis direction is a certain direction (for example, the lengthwise direction when the operation device 3 is rod-shaped) in the operation device 3. The Y-axis direction is for example a direction orthogonal to the X-axis direction and to a certain surface on which a portion or the entirety of the input portion 33 is positioned in the operation device 3. The Z-axis direction is the direction orthogonal to both the X-axis direction and the Y-axis direction. The axis on which the acceleration detector 34 detects acceleration may also be one axis, or two axes, or four or more axes. Below, the three-dimensional coordinate system formed by the X-axis, the Y-axis and the Z-axis is at times called the sensor coordinate system.

Returning to FIG. 3, the angular speed detector 35 is a gyro sensor and detects, at certain time intervals, the angular speed (rotational speed per unit time) with which the operation device 3 rotates. The angular speed output by the angular speed detector 35 is for example the angular speed centered on each of the three axes. The gyro sensor is, for example, a vibration-type gyro sensor or the like using a micro electro-mechanical system (MEMS). The angular speed detector 35 outputs the angular speed information indicating the detected angular speed to the operation processor 36 at certain time intervals (for example, 1/100-second intervals).

Figure 4B:
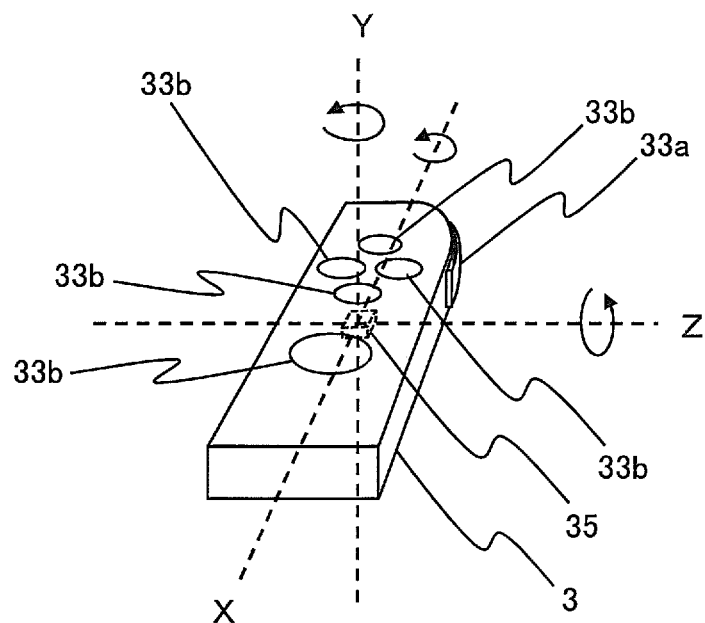
FIG. 4(b) is a schematic view for describing one example of the axes of angular speed detected by the angular speed detector.

FIG. 4(b) is a schematic view for describing one example of the axes of angular speed detected by the angular speed detector 35. In the example shown in FIG. 4(b), the angular speed detector 35 detects the angular speed centered on each of the X-axis, the Y-axis and the Z-axis. The X-axis, the Y-axis and the Z-axis pass through the angular speed detector 35 and are parallel to the X-axis, the Y-axis and the Z-axis of the sensor coordinate system in the angular speed detector 35. The axis of angular speed detected by the angular speed detector 35 may also be one axis, two axes, or four or more axes.

Returning to FIG. 3, the operation processor 36 has one processor or a plurality of processors, and peripheral circuits thereof. The operation processor 36 comprehensively controls the overall actions of the operation device 3, and for example, is a CPU. The operation processor 36 controls the actions of the transmitter 361 and the like such that the various types of processes of the operation device 3 are executed in an appropriate order in accordance with the programs and the like stored in the operation memory 32. The transmitter 361 is a function module realized by programs executed by a processor with which the operation processor 36 is equipped. Or, the operation processor 36 may be installed in the operation device 3 as firmware.

FIG. 5 is a diagram showing one example of a data structure of the operation information output by the operation device 3. The operation information is output at certain time intervals (for example, 1/100-second intervals).

The operation information includes various types of information output by the input portion 33, the acceleration detector 34 and the angular speed detector 35 in accordance with the player's movements. The operation information shown in FIG. 5 includes operation device identification information, X-axis direction acceleration information, Y-axis direction acceleration information, Z-axis direction acceleration information, X-axis angular speed information, Y-axis angular speed information, Z-axis angular speed information and input portion operation information.

The operation device identification information is identification information for identifying the operation device 3. The identification information for identifying the operation device 3 is stored in the operation memory 32.

The X-axis direction acceleration information is acceleration information showing the acceleration in the X-axis direction detected by the acceleration detector 34, the Y-axis direction acceleration information is acceleration information showing the acceleration in the Y-axis direction detected by the acceleration detector 34, and the Z-axis direction acceleration information is acceleration information showing the acceleration in the Z-axis direction detected by the acceleration detector 34.

The X-axis angular speed information is angular speed information showing the angular speed centered on the X-axis detected by the angular speed detector 35, the Y-axis angular speed information is angular speed information showing the angular speed centered on the Y-axis detected by the angular speed detector 35, and the Z-axis angular speed information is angular speed information showing the angular speed centered on the Z-axis detected by the angular speed detector 35.

The input portion operation information is information included only when input portion operation information from the input portion 33 is detected. For example, when the input portion 33 is pressed for one second by the player, the input portion operation information output from the input portion 33 is included in the operation information output during this one second. When the operation information is output at 1/100-second intervals, the input portion operation information output from the input portion 33 is included in each of the items of operation information output during the one second in which the input portion 33 is pressed by the player.

FIG. 6 through FIG. 9 are diagrams each showing one example of various types of screens displayed on the display device 23 of the game processing device 2.

Figure 6A:
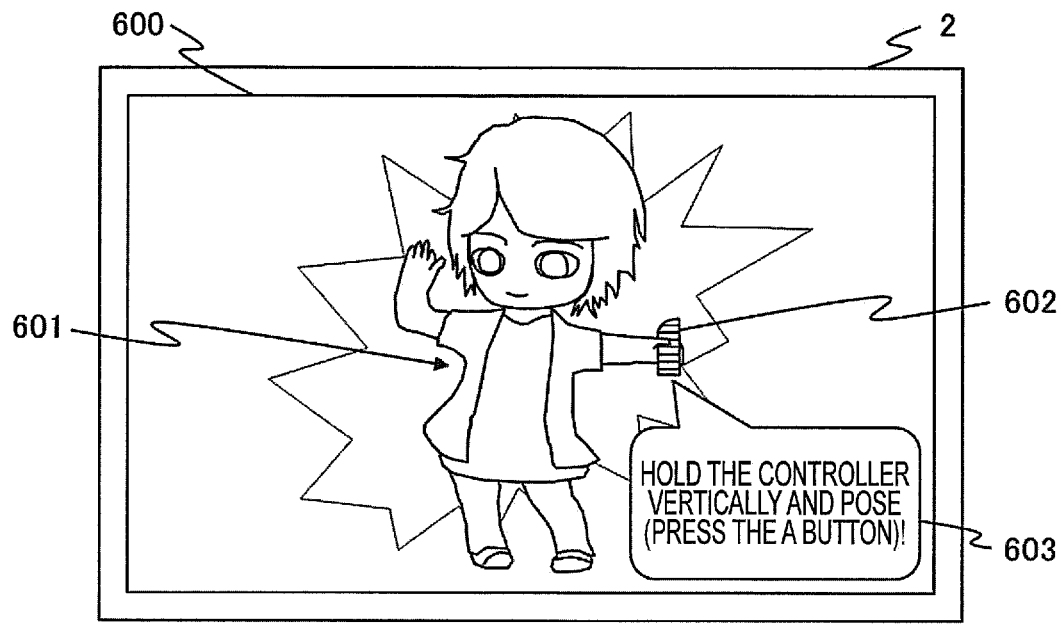
FIGS. 6(a) and 6(b) are diagrams showing one example of a screen displayed on a display device of the game processing device.

FIG. 6(a) is a diagram showing one example of a preceding game screen 600 that includes an image for causing the player holding the operation device 3 to strike a certain pose. The preceding game is a game executed in the calibration process, and the preceding game screen 600 is a game screen related to the preceding game.

The preceding game screen 600 is displayed prior to the start of the game of each game field in a subsequent game executed by the game processing device 2. In addition, the preceding game screen 600 may be displayed when the game processing device 2 launches a control program for controlling the progress of the game. In addition, the preceding game screen 600 may be displayed each certain time interval (for example, every 10 minutes) during the progress of the subsequent game executed by the game processing device 2.

The preceding game screen 600 includes a character image 601, a controller image 602, and an instruction display region 603.

The character image 601 is a moving image or a still image showing a character such as a person, a robot, an animal or the like. When the character image 601 is a moving image, display of the character image 601 is controlled such that the character displayed by the character image 601 performs a series of movements (a dance or the like).

The controller image 602 is an image that is displayed so as to be held by the character shown by the character image 601. The controller image 602 may be an image displayed so as to be attached to a certain position on the body of the character displayed by the character image 601.

The instruction display region 603 is a display region where text information showing instructions for causing the player to perform a movement such that the posture of the operation device 3 becomes a specified posture is displayed.

The player performs a preceding game in which a certain pose is struck in accordance with the contents of the instructions in the instruction display region 603 along with the character image 601 and the controller image 602 displayed in the preceding game screen 600. The preceding game is a dance game, an imitation game or the like. Upon striking the certain pose, the player performs the operation of pressing the input portion 33a corresponding to "button A".

As shown in FIG. 4, the input portion 33a is positioned at the end of the operation device 3 in the lengthwise direction, so when the player holds the operation device 3, the player performs the operation of pressing the input portion 33a with the thumb. When the input portion 33a is pressed by the player, calibration information is transmitted from the operation device 3 to the game processing device 2. In this case, even if the input portion 33b is pressed by the player, calibration information is not transmitted from the operation device 3 to the game processing device 2.

Included in the calibration information is, for example, information showing the direction of gravitational acceleration detected by the acceleration detector 34 at the timing at which the input portion 33a is pressed by the player. Information showing the direction of gravitational acceleration is X-axis direction acceleration information, Y-axis direction acceleration information and Z-axis direction acceleration information. Upon receiving the calibration information from the operation device 3, the game processing device 2 determines the direction of gravitational acceleration based on the calibration information (X-axis direction acceleration information, Y-axis direction acceleration information and Z-axis direction acceleration information), and executes a degree-of-matching determination process based on the direction of gravitational acceleration and the X-axis direction.

Figure 6B:
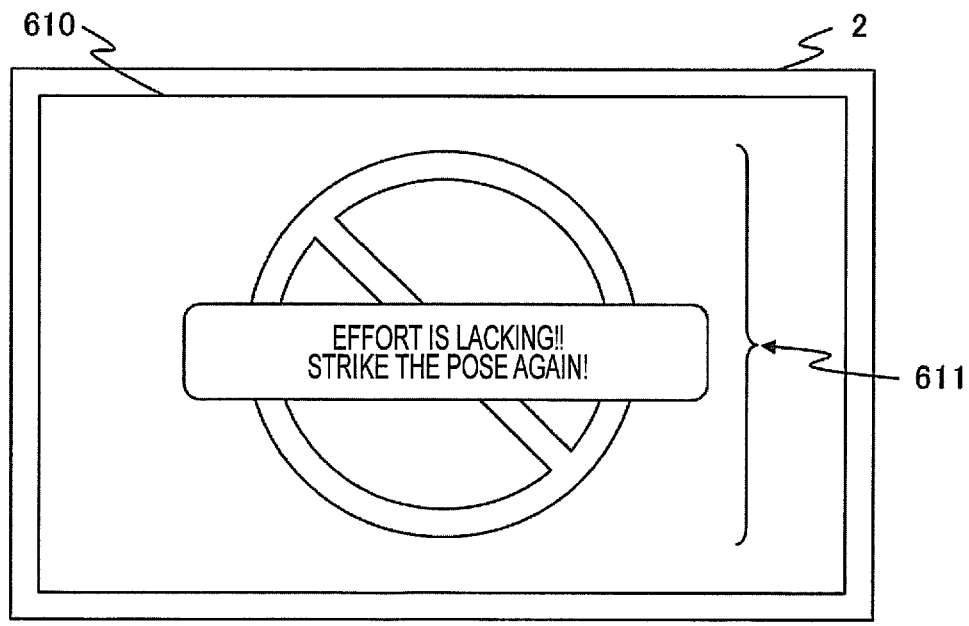

FIG. 6(b) is a diagram showing one example of a calibration failure screen 610. The calibration failure screen 610 is a screen that is displayed when a determination is made by the degree-of-matching determination process that calibration failed. For example, the determination is made that calibration has failed when the game processing device 2 determines that the angle of difference between the direction of gravitational acceleration and the X-axis direction is larger than a certain angle, based on the calibration information.

Failure presentation information 611 indicating that calibration has failed is displayed in the calibration failure screen 610. The failure presentation information 611 is, for example, an image and/or text information indicating that calibration has failed.

Figure 7A:
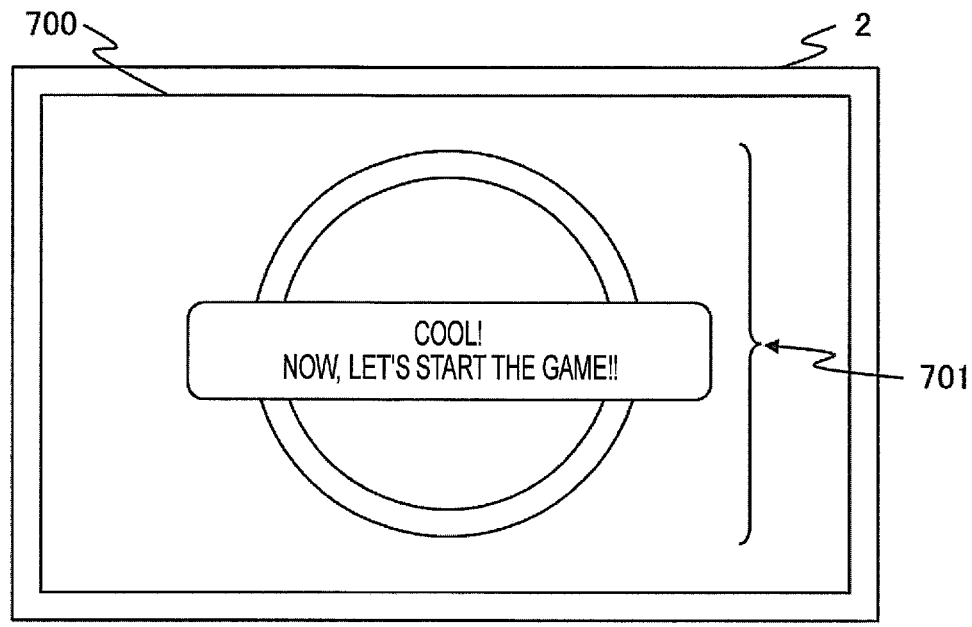
FIGS. 7(a) and 7(b) are diagrams showing one example of a screen displayed on a display device of the game processing device.

FIG. 7(a) is a diagram showing one example of a calibration success screen 700. The calibration success screen 700 is a screen that is displayed when the determination is made by the degree-of-matching determination process that calibration was successful. For example, the determination is made that calibration was successful when the game processing device 2 determines that the angle of difference between the direction of gravitational acceleration and the X-axis direction is not greater than a certain angle, based on the calibration information.

Success presentation information 701 that is an image or text information indicating that calibration was successful is displayed in the calibration success screen 700.

Figure 7B:
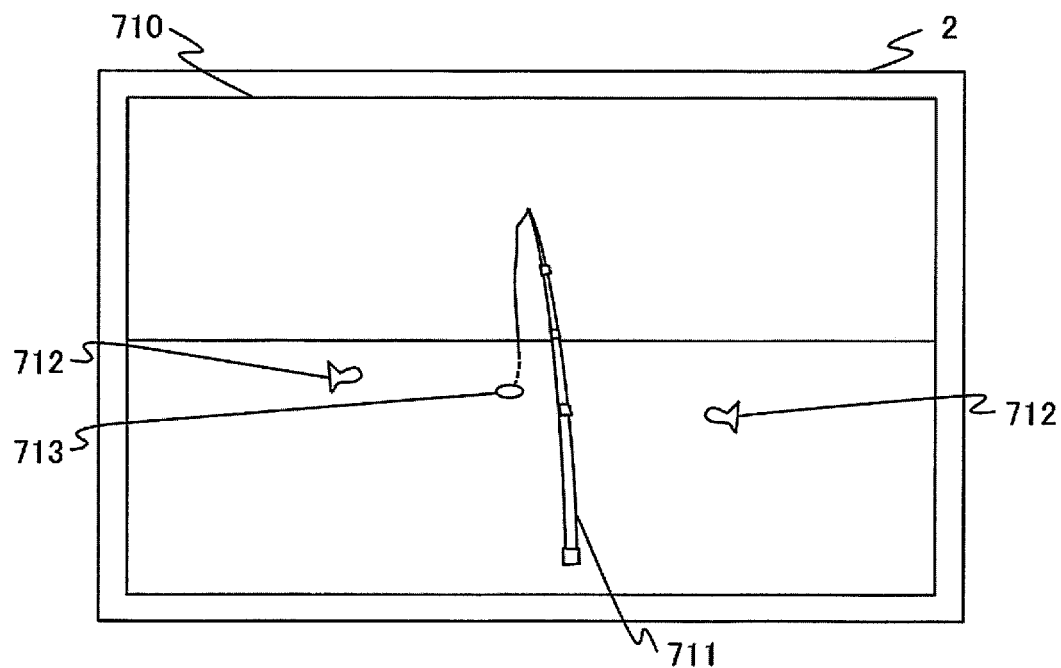

FIG. 7(b) is a diagram showing one example of a subsequent game screen 710. The subsequent game screen 710 is an image that is displayed after the calibration success screen 700 is displayed. For example, the subsequent game screen 710 is a screen indicating the progress of the subsequent game using the operation device 3 that was successfully calibrated. In the example of the subsequent game screen 710 shown in FIG. 7(b), a screen is displayed that shows the progress of a fishing game in which fish objects 712 are caught using a fishing rod object 711 that changes in accordance with operation of the operation device 3.

Below, the description takes as an example a case in which the subsequent game that is provided by the game device 1 of this embodiment is a fishing game that displays images showing a virtual game space that includes a fishing rod object modeled on a fishing rod.

The player holds either the operation device 3a or the operation device 3b as a fishing rod, and for example does a casting motion. The casting motion is a motion, in fishing, of casting a lure or baited fishhook or the like onto the water's surface (sea surface, lake surface, or river surface). The lure or baited fishhook or the like is bound to fishing line, and the fishing line is wound on a reel provided on the fishing rod held by the fisherman. The casting motion is the motion of the fisherman drawing the fishing rod back overhead and then flicking the fishing rod in the forward direction.

In accordance with the casting motion by the player, the motion sensor of the operation device 3 being held as the fishing rod outputs operation information, and the operation device 3 held as the fishing rod outputs the operation information to the game processing device 2. The game processing device 2 retrieves the operation information output from the operation device 3.

Upon determining that the retrieved operation information satisfies a casting operation condition, the game processing device 2 identifies the retrieved operation information as casting operation information. The casting operation condition is, for example, the condition that when acceleration information is output as the operation information, the retrieved acceleration information exceeds a certain numerical value.

The game processing device 2 causes the image of the fishing rod object 711 to change (move or deform) such that the fishing rod object 711 makes a movement in accordance with the casting motion, based on the casting operation information. The game processing device 2 generates image data for displaying the virtual game space including the changed fishing rod object 711, and displays an image showing the virtual game space on the display device 23 based on the generated image data.

In conjunction with the movement of the fishing rod object 711 in accordance with the casting motion, the game processing device 2 moves the object 713 imitating a lure or baited fishhook to an arrival position within the virtual game space in accordance with the casting operation information. Below, there are cases in which the object 713 imitating a lure or baited fishhook is called the fishhook object 713.

When the fishing rod object 711 and the fishhook object 713 have changed in accordance with the casting operation information, the game processing device 2 causes a hooking game to progress. In the hooking game, when the player performs a hooking motion at the time when an object 712 imitating a fish or the like that is the object of fishing bites the fishhook object 713, a determination is made that the so-called hooking has been successful. Below, there are cases in which the object 712 imitating a fish or the like that is the object of fishing is called the fish object 712. In addition, the timing at which the fishhook object 713 is bitten is a hooking determination period (for example, 0.5 second) from when a certain location (for example, a location corresponding to the mouth) of the fish object 712 moves within the hookable range of the fishhook object 713.

When hooking is successful, a fight game progresses in which the player acquires the fish object 712 that moves integrally with the fishhook object 713 in accordance with the player's operation. In the fight game, a health point parameter associated with the fish object 712 changes in accordance with (i) the movement direction of the fish object 712 that moves along with the fishhook object 713 and (ii) the position and/or inclination of the fishing rod object 711. When the health point parameter associated with the fish object 712 is not greater than a certain value, or when the fish object 712 has moved close to the position of the virtual camera, the determination is made that the player has acquired the fish object 712.

Figure 8A:
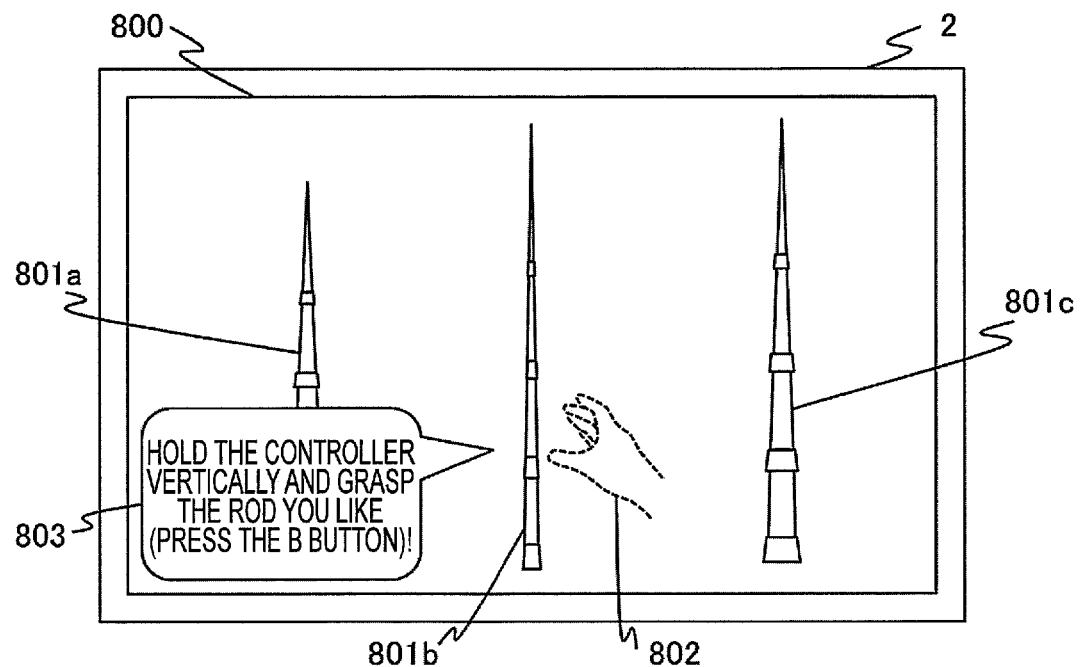
FIGS. 8(a) and 8(b) are diagrams showing one example of a screen displayed on a display device of the game processing device.
Figure 8B:
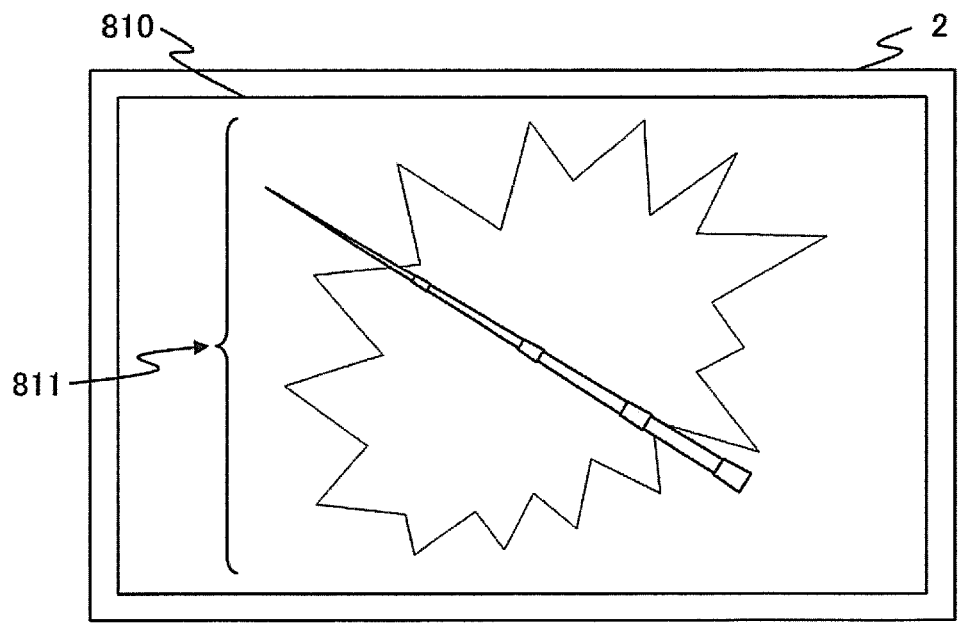

FIG. 8(*a*) is a diagram showing another example of the preceding game screen 800 that includes an image for causing the player holding the operation device 3 to perform the action of grasping the game object. The preceding game screen 800 is displayed at the same timing as the preceding game screen 600.

Included in the preceding game screen 800 are game objects 801*a*-801*c*, a virtual hand image 802 and an instruction display region 803.

The game objects 801*a*-801*c* are game objects that the player game content operated by the player uses within the subsequent game. For example, when the subsequent game is a fishing game, the game objects 801*a*-801*c* are fishing rod objects. When the subsequent game is a battle game, the game objects 801*a*-801*c* are weapon objects and/or armor objects. When the subsequent game is a sports game, the game objects 801*a*-801*c* are sports equipment objects (for example, bats, racquets or the like) used in the sports game.

The virtual hand image 802 is an image showing a hand of the player game content operated by the player. The virtual hand image 802 is controlled so as to move within the preceding game image 800 in accordance with operation of the operation device 3. For example, when the player moves the operation device 3 to the right, the game processing device 2 calculates the movement speed and the movement direction of the virtual hand image 802, based on the acceleration information output from the operation device 3. Furthermore, the game processing device 2 performs display control such that the virtual hand image 802 moves within the virtual game space, based on the calculated movement speed and movement direction.

The instruction display region 803 is a display region where text information showing instructions for causing the player to perform a movement such that the posture of the operation device 3 becomes a specified posture is displayed. In the example shown in FIG. 8(*a*), the game objects 801*a*-801*c* have a long, slender rod shape and are displayed lined up in a vertical direction of the preceding game screen 800. The player performs, with the hand holding the operation device 3, an operation that causes the virtual hand image 802 to move, and when the virtual hand image 802 overlaps any of the game objects 801*a*-801*c*, the player performs the operation of pressing the input portion 33*b* corresponding to "button B" on the operation device 3.

As shown in FIG. 4, the input portion 33*b* is positioned at a location that is not at the end of the operation device 3 in the lengthwise direction, so when the player holds the operation device 3, the player can perform the operation of pressing the input portion 33*b* by further clenching the operation device 3. When the input portion 33*b* is pressed by the player, the calibration information is transmitted from the operation device 3 to the game processing device 2. In this case, even if the input portion 33*a* is pressed by the player, the calibration information is not transmitted from the operation device 3 to the game processing device 2.

Included in the calibration information is information showing the direction of gravitational acceleration (the vertically downward direction) detected by the acceleration detector 34, at the time when the input portion 33*b* is pressed by the player. Upon receiving the calibration information from the operation device 3, the game processing device 2 executes the degree-of-matching determination process based on the calibration information.

FIG. 8(*b*) is a diagram showing one example of a calibration success screen 810. The calibration success screen 810 is an image that is displayed when a determination is made by the degree-of-matching determination process that calibration was successful. In the calibration success screen 810, through calibration being successful, used object information 811 is displayed showing the game object to be used in the subsequent game.

The game object shown by the used object information 811 is the game object 801 that overlapped the virtual hand image 802 when the operation of pressing the input portion 33*b* was performed. After the calibration success screen 810 is displayed, a subsequent game screen 710 such as that shown in FIG. 7(*b*) is displayed.

Figure 9A:
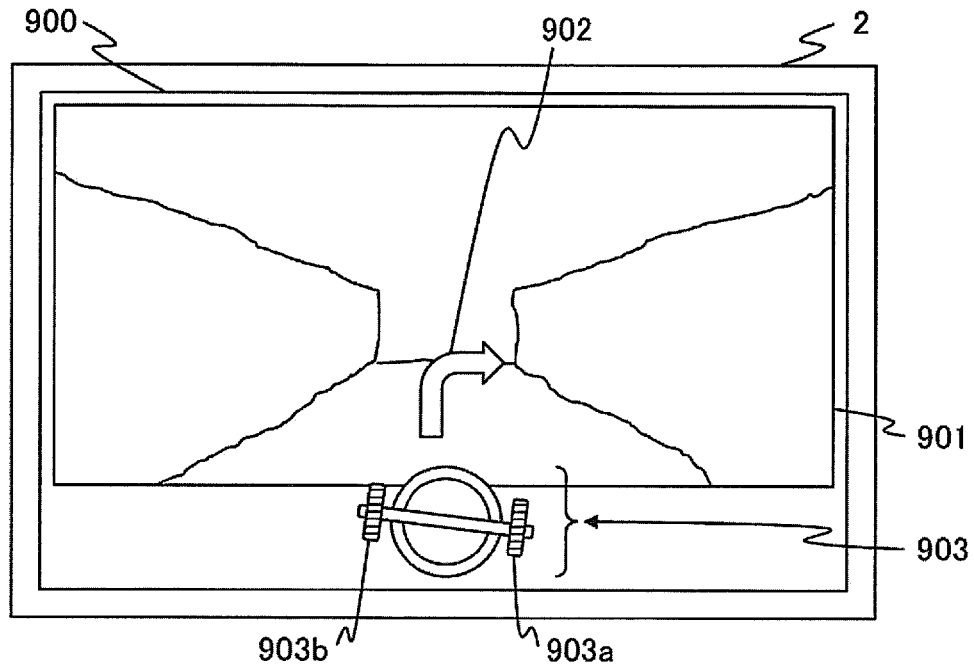
FIGS. 9(a) and 9(b) are diagrams showing one example of a screen displayed on a display device of the game processing device.
Figure 9B:
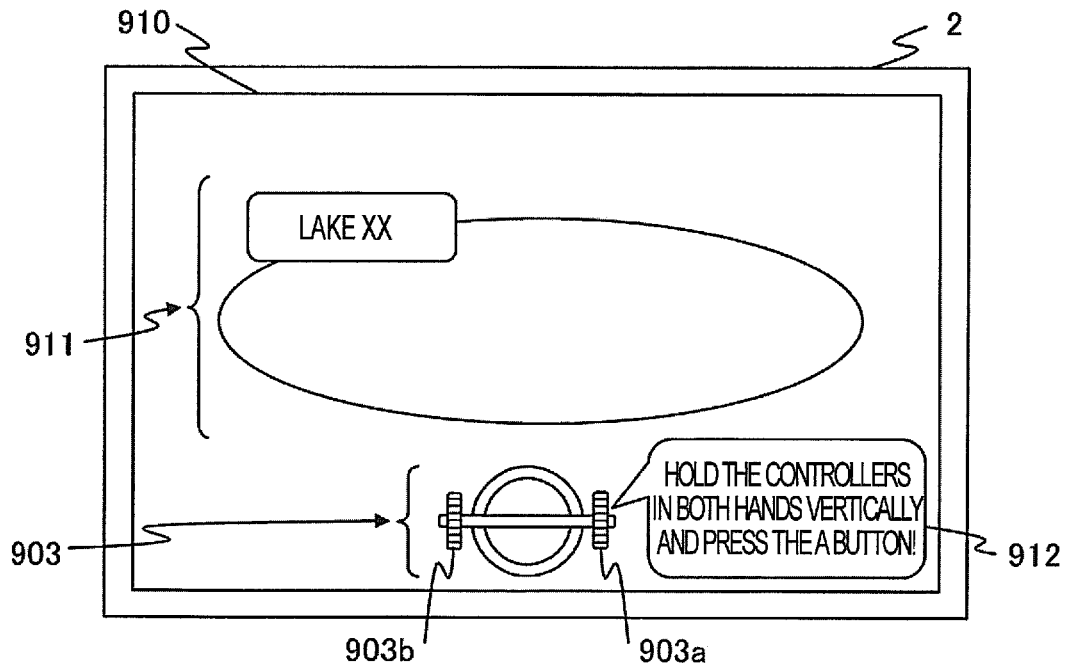

FIGS. 9(*a*) and 9(*b*) are diagrams showing one example of preceding game screens 900 and 910 that include images for causing the player holding the operation device 3 to perform a movement that steers a game object that moves within the virtual game space. The preceding game screen 900 is displayed after the conclusion of each game field in the subsequent game executed by the game processing device 2 and when the game progresses to the next game field. The preceding game screen 910 is displayed when a completion condition is satisfied in the preceding game screen 900.

Included in the preceding game screen 900 are a virtual game space image 901, an instruction image 902 and a steering wheel image 903.

When a plurality of game fields is established in the subsequent game, the virtual game space image 901 is a projected image of the virtual game space from the line of sight direction of a point of view positioned within the virtual game space showing a location between each game field and the next game field. The point of view is, for example, the point of view of a player content positioned in the driver's seat of a game object (car, motorbike, ship, airplane or the like) movable within the virtual game space in accordance with operation of the operation device 3 by the player. The point of view moves within the virtual game space in accordance with movement of the game object. In addition, the line-of-sight direction of the point of view is changed in accordance with the movement direction of the game object. The preceding game in the preceding game screen 900 shown in FIG. 9(a) is a game of progression of the game object, but may be another game.

The instruction image 902 is an image showing the direction of progress toward the next game field in the virtual game space.

The steering wheel image 903 is a game object that rotates in accordance with operation of the operation device 3 by the player. A control stick image 903a included in the steering wheel image 903 corresponds to the operation device 3a, and a control stick image 903b included in the steering wheel image 903 corresponds to the operation device 3b. When the player moves the operation devices 3a and 3b simultaneously to the right or rotates these simultaneously to the right, the steering wheel image 903 display is controlled so as to rotate to the right, as shown in FIG. 9(a). In addition, when the operation devices 3a and 3b are simultaneously rotated to the left or simultaneously moved to the left, the steering wheel image 903 displayed is controlled so as to rotate to the left. The game object changes progress direction to the right direction in accordance with the amount of right rotation of the steering wheel image 903, and in addition, the game object changes progress direction to the left direction in accordance with the amount of left rotation of the steering wheel image 903.

The progress speed of the game object within the virtual game space may be constant, or may be a speed in accordance with the amount of inclination by which an upper end of the operation device 3 is tilted forward and downward. The completion condition of the preceding game in the preceding game screen 900 is the condition that the game object moving within the virtual game space has arrived at the next game field (or close thereto). The preceding game screen 910 is displayed when the completion condition is satisfied in the preceding game in the preceding game screen 900.

Included in the preceding game screen 910 is a game field image 911, an instruction display region 912 and a steering wheel image 903.

The game field image 911 is an image showing the next game field at which the game object has arrived.

The instruction display region 912 is a display region where text information is displayed that shows instructions for causing the player to perform a movement such that the posture of the operation device 3 becomes a specified posture. The steering wheel image 903 is an image corresponding to when the posture of the operation device 3 becomes the specified posture.

The player performs the operation of pressing the input portion 33a corresponding to "button A" when the posture of the operation device 3 becomes the specified posture (for example, a posture of the operation device 3 such that a certain direction preset in the operation device 3 (the lengthwise direction when the operation device 3 is rod-shaped) is approximately the same as a vertical direction).

As shown in FIG. 4, the input portion 33a is positioned at the end of the operation device 3 in the lengthwise direction, so when the player holds the operation device 3, the player performs the operation of pressing the input portion 33a with the thumb. When the input portion 33a is pressed by the player, calibration information is transmitted from the operation device 3 to the game processing device 2. In this case, even if the input portion 33b is pressed by the player, the calibration information is not sent from the operation device 3 to the game processing device 2.

Included in the calibration information is, for example, information indicating the direction of the gravitational acceleration (the vertically downward direction) detected by the acceleration detector 34 at the time when the input portion 33a is pressed by the player. When the game processing device 2 receives the calibration information from the operation device 3, the degree-of-matching determination process is executed based on the calibration information.

Furthermore, the game processing device 2 causes a game image corresponding to the result of the degree-of-matching determination to be displayed on the display device 23, and concludes the calibration process. When the degree of matching is higher than a certain value, the determination is made that calibration was successful, for example. When the game object is an airplane, when calibration is successful, an image showing descending from the sky is displayed as the game image in the game field image 911. When descending concludes, the subsequent game screen 710 shown in FIG. 7(b) is displayed When calibration has failed (when the degree of matching is not greater than a certain value), an image to encourage the player to again perform the operation for calibration is displayed as the game image. When calibration has failed, the position of the game object may be returned to the start position (the prior game field). Through this, it is possible to carefully control the posture of the operation device 3 with respect to the player so that calibration does not fail.

Below, the game progress controller 241 and the display processor 242 with which the processor 24 of the game processing device 2 is provided are described.

The game progress controller 241 reads information relating to each type of object stored in the memory 22, and creates a virtual game space V in which each type of object is positioned, based on the information read. The objects positioned in the virtual game space V are, for example, a fishing rod object OJ1, a fishhook object OJ2 and a fish object OJ3. In addition, a virtual camera C is positioned in the virtual game space V. The game progress controller 241 reads the object position PO1 stored in the memory 22, and places the fishing rod object OJ1 at the object position PO1.

The display processor 242 generates an image showing the virtual game space V within the field of view FV projected onto a certain two-dimensional screen positioned in the line-of-sight direction of the of the virtual camera C, and displays the generated image on the display device 23.

In addition, when an object in the virtual game space V is generated or changed (move or deform), when the generated or changed object is included within the field of view FV, the display processor 242 generates an image showing the virtual game space V within the field of view FV, including the changed object. The display processor 242 displays the generated image on the display device 23.

In addition, the display processor 242 displays a tension parameter gauge G1 and a health point parameter gauge G2 on the display device 23, superimposed on the image showing the virtual game space V within the field of view FV, projected on the certain two-dimensional screen positioned in the line-of-sight direction of the virtual camera C.

In addition, the display processor 242 displays on the display device 23 an image showing the virtual game space V including at least a guide object OJ6, when progress of a first special game A has started. In addition, the display processor 242 displays on the display device 23 an image showing the virtual game space V including a fish object OJ3 and a target object OJ7, when progress of a next special game B has started.

Figure 10:
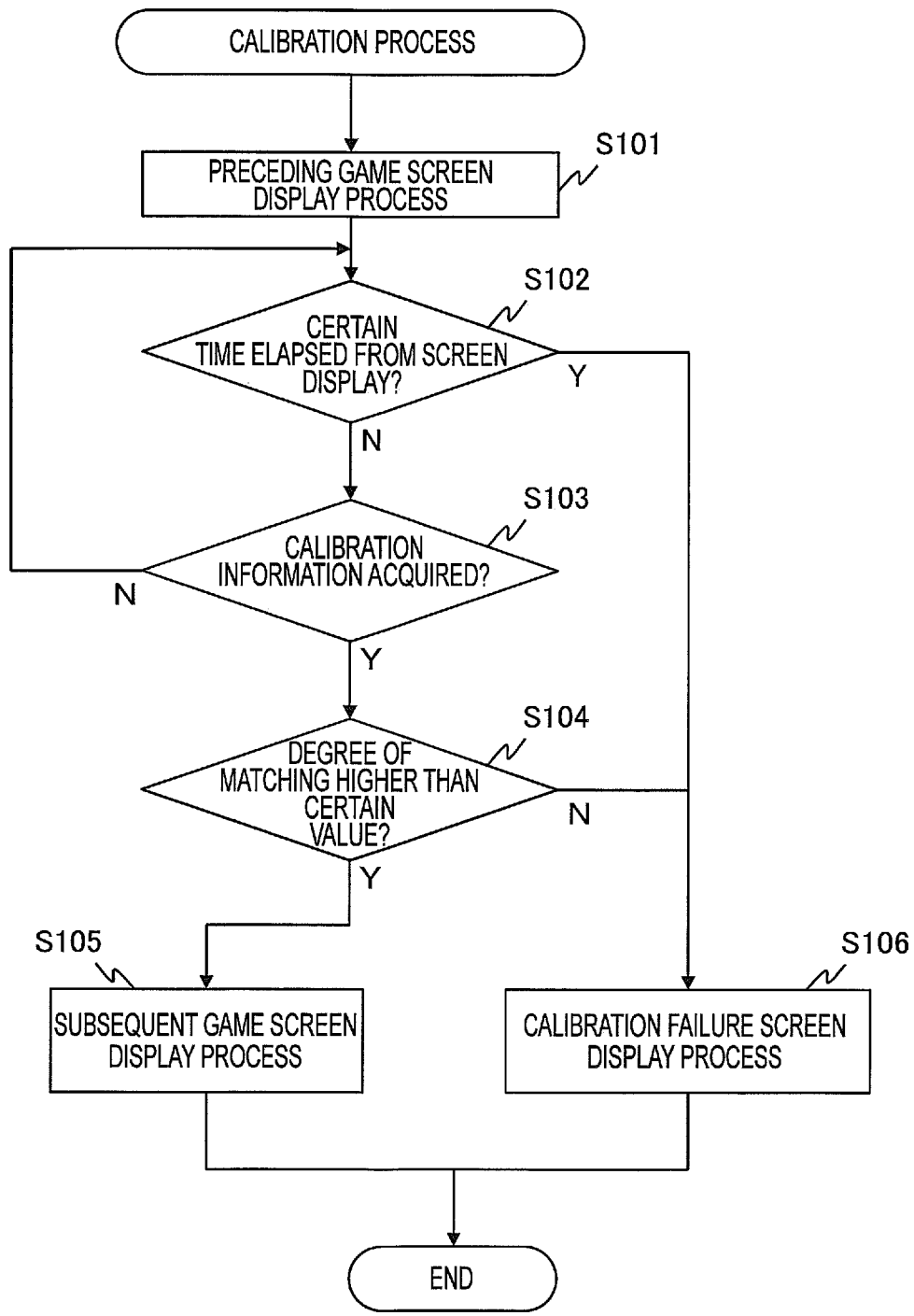
FIG. 10 is a diagram showing one example of an operation flow of calibration processing.

FIG. 10 is a diagram showing one example of the operation flow of the calibration process by the processor 24 of the game processing device 2.

First, when there is a determination by the game progress controller 241 that the subsequent game the player was playing has ended, the display processor 242 displays the preceding game screen on the display device 23 (step S101).

The game progress controller 241 determines whether or not a certain time has elapsed from when the preceding game screen was displayed (step S102).

When a determination is made by the game progress controller 241 that the certain time has elapsed from when the preceding game screen was displayed (step S102-Yes), the display processor 242 displays a calibration failure screen on the display device 23 (step S106).

When a determination is made by the game progress controller 241 that the certain time has not elapsed from when the preceding game screen was displayed (step S102-No), the acquisition portion 243 determines whether or not calibration information from the operation device 3 has been retrieved (step S103).

When the determination is made by the acquisition portion 243 that the calibration information has not been retrieved (step S103-No), the game progress controller 241 returns to the process in step S102.

When the determination is made by the acquisition portion 243 that the calibration information has been retrieved (step S103-Yes), the determination portion 244 determines whether or not the degree of matching is higher than a certain value (step S104).

When the determination is made by the determination portion 244 that the degree of matching is higher than the certain value (step S104-Yes), the display processor 242 displays the subsequent game screen (step S105), and the game progress controller 241 concludes the series of processes.

When the determination is made by the determination portion 244 that the degree of matching is not greater than the certain value (step S104-No), the display processor 242 displays the calibration failure screen (step S106), and the game progress controller 241 concludes the series of processes.

As described above, the game device 1 can realize calibration of a motion sensor without causing the player to be aware that an operation for calibration is being performed.

VARIATION EXAMPLE 1

This invention is not limited to the above embodiment. For example, the game processing device 2 may be connected to a display device with wires or wirelessly, and may display on the display device the same image as the image displayed on the display device 23. The display device is, for example, a television receiver, and comprises a liquid crystal display or an organic EL display. The display device displays an image in accordance with the image data supplied from the processor 24. In this case, the display device 23 may display the same image as the display device or, when the image is displayed on the display device, the image need not be displayed on the display device 23. In addition, the display device 23 need not be provided in the game processing device 2.

VARIATION EXAMPLE 2

In addition, the display device that displays the same image as the image displayed on the display device 23 may be a head mounted display (HMD).

In this case, an angular speed sensor or an orientation measurement sensor is provided in the display device. When the display device mounted on the player's head rotates a certain angle in a certain direction in accordance with the player moving the head, the rotational direction and rotational angle of the display device is measured by the angular speed sensor and the orientation measurement sensor.

The display device transmits the rotational direction and rotational angle measured by the angular speed sensor and the orientation measurement sensor to the game processing device 2 at each certain time interval. Each time the display device rotational direction and rotational angle are received, the game processing device 2 rotates the virtual camera within the virtual game space in the same rotational direction and by the same rotational angle, based on the rotational direction and rotational angle.

Through this, the player on which the display device is mounted can view the virtual game space via the display device, by moving the head and/or body and performing the action of viewing the surroundings.

VARIATION EXAMPLE 3

In addition, another subsequent game other than the fishing game may be provided by the game device 1 of this embodiment. For example, a sports game such as a golf game in which a character operated by the player plays golf using a golf club, or a baseball game in which a character operated by the player plays baseball using a bat, may be provided by the game device 1 of this embodiment. With this kind of sports game, the character grasps an equipment object imitating a golf club or a bat or the like and the game progresses using the equipment object.

VARIATION EXAMPLE 4

The game provided by the game device 1 of this embodiment is not limited to the above-described examples and may be any kind of game as long as the game is a virtual reality (VR) game in which a game object held by the player game content is used with a subsequent game. In the subsequent game, the player game content or the game object may be displayed on the display device 23.

VARIATION EXAMPLE 6

The calibration process may be posture information that the game processing device 2 retrieves at certain time intervals. In this case, certain flag information is appended to the posture information corresponding to the timing at which the input portion 33 is pressed by the player. The game processing device 2 retrieves, as the calibration information, the X-axis direction acceleration information, the Y-axis direction acceleration information and the Z-axis direction acceleration information included in the posture information to which the certain flag information is appended.

VARIATION EXAMPLE 7

The timing at which the game processing device 2 retrieves the posture information is not limited to the timing at which the posture information transmitted from the operation device 3 is retrieved by the input portion 33 being pressed by the player. For example, at certain intervals when the preceding game screen is displayed, this may be timing at which it is determined that a time during which change in the direction of the gravitational acceleration is within a certain range has continued for at least a certain time. In this case, the game processing device 2 retrieves the operation information as the posture information at each certain time interval, and determines whether or not the time during which the change in the gravitational acceleration direction is within a certain range has continued for at least a certain time in the certain interval, based on the retrieved operation information.

Through this, even if the operation device 3 is attached to a certain position on the body of the player, execution of the calibration process is possible.

VARIATION EXAMPLE 8

The game progress controller 241 may be such that in step S104 shown in FIG. 10, even if the degree of matching is not greater than the certain value, the display processor 242 may display the subsequent game screen and the game progress controller 241 may execute the subsequent game. In this case, the game progress controller 241 may alter the difficulty of the game in accordance with the degree of matching.

For example, when the subsequent game is a fishing game, the game device 1 may perform control such that the player is caused to do a bait scattering operation prior to the player doing a casting operation.

When the display processor 242 displays on the display device 23 information indicating that a bait scattering operation is possible, the player can do a bait scattering operation a certain number of times. For example, when the game progress controller 241 has retrieved acceleration information of at least a certain acceleration simultaneously with the casting operation, it is determined that a bait scattering operation has been done, and a scattered bait object is generated in a certain area (for example, an area near the virtual camera). The fish object 712 performs behavior such as being attracted to the scattered bait object.

In this manner, the fish object 712 is caused to move by the bait scattering operation, and the difficulty of catching the fish object 712 can be altered.

The game progress controller 241 may cause the bait-scattering generation area to be altered in accordance with the degree of matching. For example, the game progress controller 241 sets the certain area to an area closer to the virtual camera, the higher the degree of matching. Through this, the higher the degree of matching, the more the fish objects 712 move near the virtual camera of the player, so the difficulty of catching the fish objects 712 decreases. In addition, the lower the degree of matching, the more the fish objects 712 move to positions separated from the virtual camera of the player, so the difficulty of catching the fish objects 712 is increased. When the degree of matching is lower than a certain value, control may be executed such that the bait scattering operation cannot be done.

A person skilled in the art should understand that various alterations, substitutions and revisions can be added to this without deviating from the spirit and scope of this invention.

EXPLANATION OF SYMBOLS

1 Game device
2 Game processing device
21 Communication portion
22 Memory
23 Display device
24 Processor
241 Game progress controller
242 Display processor
243 Acquisition portion
244 Determination portion
3 Operation device
31 Operation communication portion
32 Operation memory
33 Input portion
34 Acceleration detector
35 Angular speed detector
36 Operation processor
361 Transmitter

The invention claimed is:

1. A non-transitory computer-readable medium storing a control program for a game device connectable to an operation device held by a player or attached to a certain position on a body of the player, the game device comprising one or more processors and a memory, wherein the control program causes the one or more processors of the game device to execute the following:
   accessing the memory and causing a first image to be displayed on a display device, in order to cause the player to perform a movement such that a posture of the operation device becomes a specified posture;
   retrieving posture information relating to the posture of the operation device at a certain timing;
   determining a degree of matching between the posture of the operation device and the specified posture based on the retrieved posture information; and
   accessing the memory and causing a second image in accordance with the determination result to be displayed on the display device, wherein
   the first and second images are game images,
   the second image is different from the first image,
   in response to the degree of matching being higher than a certain value, a calibration process for the operation device is determined to be successful and the second image is displayed after the calibration process is determined to be successful,
   the game device executes a first game in which at least one game content is moved in each of a plurality of game fields, and a second game that moves within a virtual space showing a location between two game fields corresponding to two game fields of the plurality of game fields of the first game,
   the first image is an image showing progress of the second game, and is an image for causing the player holding the operation device, or to whom the operation device is attached, to steer a game object moving in the virtual space, and
   when the progress of the second game concludes and the degree of matching is higher than the certain value, the second image is an image showing the progress of the first game in a destination game field.

2. The non-transitory computer-readable medium according to claim 1, wherein
   the first image is an image for causing the player holding the operation device, or to whom the operation device is attached, to take a certain pose, and
   when the degree of matching is less than the certain value, the second image is an image for causing the player to again take the certain pose.

3. The non-transitory computer-readable medium according to claim 1, wherein
the first image encourages the player to perform the movement such that the posture of the operation device becomes the specified posture.

4. The non-transitory computer-readable medium according to claim 1, wherein
when the calibration process is determined to be unsuccessful, the second image is a calibration failure image.

5. The non-transitory computer-readable medium according to claim 1, wherein
the degree of matching is determined by determining an angle of difference between the specified posture and the posture of the operation device in the retrieved posture information.

6. A game device connectable to an operation device that is held by a player or attached to a certain position on the body of the player, the game device comprising:
a memory; and
one or more processors programmed to:
access the memory and cause a first image to be displayed on a display device to cause the player to perform a movement such that a posture of the operation device becomes a specified posture;
retrieve posture information relating to the posture of the operation device at a certain timing;
determine a degree of matching between the posture of the operation device and the specified posture based on the retrieved posture information; and
access the memory and cause a second image corresponding to a result of the determination to be displayed on the display device, wherein
the first and second images are game images,
the second image is different from the first image,
in response to the degree of matching being higher than a certain value, a calibration process for the operation device is determined to be successful and the second image is displayed after the calibration process is determined to be successful,
the game device executes a first game in which at least one game content is moved in each of a plurality of game fields, and a second game that moves within a virtual space showing a location between two game fields corresponding to two game fields of the plurality of game fields of the first game,
the first image is an image showing progress of the second game, and is an image for causing the player holding the operation device, or to whom the operation device is attached, to steer a game object moving in the virtual space, and
when the progress of the second game concludes and the degree of matching is higher than the certain value, the second image is an image showing the progress of the first game in a destination game field.

7. A control method for a game device connectable to an operation device that is held by a player or attached to a certain position on the body of the player, the game device comprising one or more processors and a memory, the control method comprising:
by the one or more processors, accessing the memory and causing a first image to be displayed on a display device in order to cause the player to perform a movement such that a posture of the operation device becomes a specified posture;
by the one or more processors, retrieving posture information relating to the posture of the operation device at a certain timing;
by the one or more processors, determining a degree of matching between the posture of the operation device and the specified posture based on the retrieved posture information; and
by the one or more processors, accessing the memory and causing a second image in accordance with the determination result to be displayed on the display device, wherein
the first and second images are game images,
the second image is different from the first image,
in response to the degree of matching being higher than a certain value, a calibration process for the operation device is determined to be successful and the second image is displayed after the calibration process is determined to be successful,
the game device executes a first game in which at least one game content is moved in each of a plurality of game fields, and a second game that moves within a virtual space showing a location between two game fields corresponding to two game fields of the plurality of game fields of the first game,
the first image is an image showing progress of the second game, and is an image for causing the player holding the operation device, or to whom the operation device is attached, to steer a game object moving in the virtual space, and
when the progress of the second game concludes and the degree of matching is higher than the certain value, the second image is an image showing the progress of the first game in a destination game field.

* * * * *